United States Patent
Satoh et al.

(10) Patent No.: US 7,269,255 B2
(45) Date of Patent: Sep. 11, 2007

(54) PORTABLE TERMINAL DEVICE

(75) Inventors: Noriyoshi Satoh, Yokohama (JP);
Kazuhiro Konishi, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 255 days.

(21) Appl. No.: 10/545,197

(22) PCT Filed: Jan. 30, 2004

(86) PCT No.: PCT/JP2004/000933

§ 371 (c)(1),
(2), (4) Date: Aug. 9, 2005

(87) PCT Pub. No.: WO2004/073287

PCT Pub. Date: Aug. 26, 2004

(65) Prior Publication Data

US 2006/0148540 A1 Jul. 6, 2006

(30) Foreign Application Priority Data

Feb. 12, 2003 (JP) .............................. 2003-033813

(51) Int. Cl.
*H04M 1/00* (2006.01)
*H04M 9/00* (2006.01)

(52) U.S. Cl. ........................ 379/428.01; 379/433.01; 379/433.13; 455/575.1

(58) Field of Classification Search ................ 379/419, 379/420.01, 420.02, 428.01, 433.01–433.03, 379/433.11, 433.13; 455/575.1, 575.3, 575.4
See application file for complete search history.

(56) References Cited

U.S. PATENT DOCUMENTS 6,549,789 B1 * 4/2003 Kfoury .................... 455/550.1
6,999,802 B2 * 2/2006 Kim ........................ 455/575.1

FOREIGN PATENT DOCUMENTS

JP 2001-169166 6/2001

* cited by examiner

*Primary Examiner*—Curtis Kuntz
*Assistant Examiner*—Tuan Duc Nguyen
(74) *Attorney, Agent, or Firm*—Pearne & Gordon LLP

(57) ABSTRACT

It is an object of the invention to provide a portable terminal device having an excellent operability in a voice communication.

There are provided a receiver (106) provided on a surface (101g) of a first housing member (101a) which is opposed to a second housing member (101b) in a closing state, a speaker (107) provided on a surface (101i) of the second housing member (101b) which is opposed to the first housing member (101a) in the closing state and having a higher output level than the first voice output means, and a control portion (120) for deciding a positional relationship of the first housing member (101a) with the second housing member (101b) and setting an output source for a voice at the start of a voice communication to either the receiver (106) or the speaker (107) corresponding to a result of the decision.

4 Claims, 16 Drawing Sheets

| | RECEIVER | SPEAKER | | PHOTO-GRAPHING BY CAMERA PORTION | DISPLAY PORTION | | |
|---|---|---|---|---|---|---|---|
| | | VOICE OUTPUT IN HANDS-FREE | INCOMING CALL SOUND | | NORMAL USING STATE (RECEIPT WAITING STATE) | DISPLAY IMAGE DURING PHOTO-GRAPHING | REPRO-DUCED IMAGE |
| FIRST CLOSING STATE | OFF | OFF | ON (OUTPUT) | POSSIBLE | ON (DISPLAY TIME) | REVERSE MIRROR IMAGE | REVERSE MIRROR IMAGE |
| SECOND CLOSING STATE | OFF | OFF | ON | IMPOSSIBLE | OFF | NO DISPLAY | NO DISPLAY |
| FIRST OPENING STATE | ON (OUTPUT) | OFF | ON | POSSIBLE | OFF (PHOTOGRAPHED IMAGE CAN BE DISPLAYED DURING OPERATION OF CAMERA PORTION) | MIRROR IMAGE | REVERSE MIRROR IMAGE |
| SECOND OPENING STATE | OFF | ON (OUTPUT) | ON | POSSIBLE | ON | REVERSE MIRROR IMAGE | REVERSE MIRROR IMAGE |

FIG. 16

| | SPEAKER | | | PHOTO-GRAPHING BY CAMERA PORTION | DISPLAY PORTION | | |
|---|---|---|---|---|---|---|---|
| | RECEIVER | VOICE OUTPUT IN HANDS-FREE | INCOMING CALL SOUND | | NORMAL USING STATE (RECEIPT WAITING STATE) | DISPLAY IMAGE DURING PHOTO-GRAPHING | REPRO-DUCED IMAGE |
| FIRST CLOSING STATE | OFF | OFF | ON (OUTPUT) | POSSIBLE | ON (DISPLAY TIME) | REVERSE MIRROR IMAGE | REVERSE MIRROR IMAGE |
| SECOND CLOSING STATE | OFF | OFF | ON | IMPOSSIBLE | OFF | NO DISPLAY | NO DISPLAY |
| FIRST OPENING STATE | ON (OUTPUT) | OFF | ON | POSSIBLE | OFF (PHOTOGRAPHED IMAGE CAN BE DISPLAYED DURING OPERATION OF CAMERA PORTION) | MIRROR IMAGE | REVERSE MIRROR IMAGE |
| SECOND OPENING STATE | OFF | ON (OUTPUT) | ON | POSSIBLE | ON | REVERSE MIRROR IMAGE | REVERSE MIRROR IMAGE |

PORTABLE TERMINAL DEVICE

TECHNICAL FIELD

The present invention relates to a portable terminal device, and more particularly to an opening type portable terminal device.

BACKGROUND ART

In recent years, a portable terminal device of a folding type which becomes compact by folding two housings through a hinge portion has been popular. In contrast to the portable terminal device of a folding type, conventionally, there has been proposed a portable terminal of a folding type (a cell phone) in which one of two housings is constituted to be rotatable with respect to the other housing.

FIG. 17 shows the external shape of a conventional portable terminal, and FIG. 17(a) shows a first closing state, FIG. 17(b) shows a first opening state, FIG. 17(c) shows a second closing state and FIG. 17(d) shows a second opening state.

As shown in FIGS. 17(a) to 17(d), a first housing 201 is provided with a display portion 203, a receiver 204 and a camera 205 on a first surface 202, and a speaker 207 is provided on a second surface 206 side to be the opposite surface of the first surface 202. A second housing 208 is provided with an operating portion 209 and a microphone 210. The first housing 201 and the second housing 202 are constituted to be openable through a hinge portion 211 in the direction of an arrow G in the drawing, and the first housing 201 is constituted to be rotatable through the hinge portion 211 in the direction of an arrow H with respect to the second housing 208.

When the portable terminal device is folded in such a manner that the display portion 203 is exposed as in the first closing state of FIG. 17(a), various information displayed on the display portion 203 can also be confirmed in the closing state, which is very convenient to a user. Moreover, it is also possible to execute various functions of the portable terminal device by simply changing the positional relationship of the first housing 201 with respect to the second housing 208 (see Patent Document 1).

(Patent Document 1) JP-A-2001-169166 Publication

In the conventional portable terminal device, it is possible to execute various functions of the portable terminal device by changing the positional relationship of the first housing with respect to the second housing. However, there has not been disclosed a specific technique for switching the receiver 204 to be a voice output source to the speaker 207 when a hands-free call is to be carried out. In other words, the switching of a function in a voice communication has not been disclosed.

The invention has been made in consideration of the circumstances and has an object to provide a portable terminal device having an excellent operability in a voice communication.

DISCLOSURE OF THE INVENTION

The invention provides a portable terminal device capable of carrying out a voice communication which couples a first housing to a second housing to be opened and closed through a hinge portion, and constitutes the first housing to be rotatable around a rotating shaft member which is orthogonal to an opening and closing shaft member of the hinge portion with respect to the second housing, comprising first voice output means provided on a surface of the first housing which is opposed to the second housing in a closing state, second voice output means provided on a surface of the second housing which is opposed to the first housing in the closing state and having a higher output level than the first voice output means, position deciding means for deciding a positional relationship of the first housing with the second housing, and setting means for setting an output source for a voice in a voice communication to either the first voice output means or the second voice output means corresponding to a result of the decision obtained by the position deciding means.

By this structure, the output source for a voice is set corresponding to the positional relationship of the first housing with respect to the second housing. Therefore, it is possible to provide a portable terminal device which is easy to use.

Moreover, the invention provides the portable terminal device, further comprising a transmitting portion provided on the same plane as a surface on which the second voice output means is provided, the setting means setting the first voice output means to be the output source for a voice if it is decided by the position deciding means that the first housing has a first positional relationship with the second housing in which the first voice output means is switched from a closing state to an opening state so as not to be exposed, and setting the second voice output means to be the output source for a voice if it is decided by the position deciding means that the first housing has a second positional relationship with the second housing in which the first voice output means is switched from the closing state to the opening state so as to be exposed.

By this structure, in the case in which the direction of the voice output of the first voice output means is almost the same as that of the voice output of the second voice output means in the opening state, the second voice output means having a high voice output level is not operated. For this reason, in the case in which a user holds the first voice output means to the ear, for example, a voice having a high output level is not output near the ear. Consequently, it is possible to ensure a safety. On the other hand, in the case in which the direction of the voice output of the first voice output means is different from that of the voice output of the second voice output means in the opening state, the second voice output means having a high voice output level is operated. Therefore, it is possible to carry out a hands-free call, for example.

Furthermore, the invention provides the portable terminal device, wherein the position deciding means decides that the first housing has the first positional relationship or the second positional relationship when a rotating angle of the first housing with respect to the second housing exceeds 90 degrees in the opening state.

By this structure, also in the case in which the position of the first housing is shifted slightly during the use of the portable terminal device in the opening state, the output source for a voice is not switched correspondingly. Therefore, it is possible to prevent the first housing from being slightly rotated during a call with the user holding the first voice output means to his (her) ear, causing the output of a voice having a high output level from the second voice output means, for example. Thus, it is possible to ensure a safety.

In addition, the invention provides the portable terminal device, wherein the hinge portion is coupled to the second housing to form a space together with the second housing in a closing state, and the second voice output means is provided in the vicinity of the hinge portion.

By this structure, the space is formed between the second housing and the hinge portion in the closing state. Therefore, it is also possible to clearly hear a voice output from the second voice output means in the closing state.

BRIEF DESCRIPTION OF THE DRAWINGS

FIG. 16 is a table collectively showing the operation state of the portable terminal device according to the embodiment of the invention.

Figure 1:
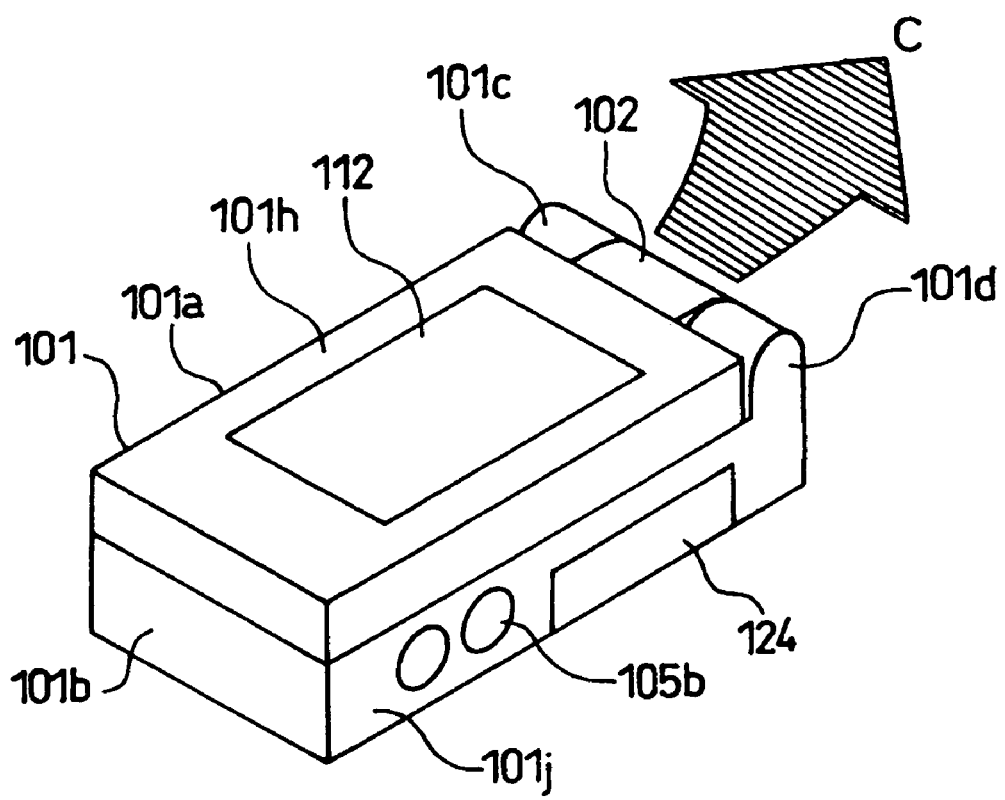
FIG. 1 is a view showing an external appearance in the first closing state of a portable terminal device according to an embodiment of the invention.

In the drawings, 101 denotes a housing, 101a denotes a first housing member, 101b denotes a second housing member, 101c and 101d denote a hinge attaching portion, 101e denotes a D hole, 101f denotes a hinge bearing portion, 101g denotes a main surface of the first housing member, 101h denotes an opposite surface to the main surface 101g, 101i denotes a main surface of the second housing member 101b, 101j denotes a side surface of the second housing member, 101k denotes a back face of the second housing member 101b, 101m denotes an upper surface of the second housing member 101b, 102 denotes a hinge portion, 103 denotes an antenna, 104 denotes a vibrator portion, 105 denotes an operating portion, 105a denotes a first operating portion, 105b denotes a second operating portion, 106 denotes a receiver, 107 denotes a speaker, 108 denotes a microphone, 109 denotes a camera portion, 109a denotes a lens group, 109b denotes a photoelectric converting unit, 110 denotes a first Hall element, 111 denotes a second Hall element, 112 denotes a display portion, 113 denotes a permanent magnet, 113a denotes a first permanent magnet, 113b denotes a second permanent magnet, 113c denotes a third permanent magnet, 114 denotes a printed board, 115 denotes a transmitting/receiving portion, 116 denotes a data converting portion, 117 denotes a voice processing portion, 118 denotes an image processing portion, 119 denotes an information recording portion, 120 denotes a control portion, 121 denotes a clearance forming projection, 122 denotes a first clearance, 123 denotes a second clearance, and 124 denotes a battery.

BEST MODE FOR CARRYING OUT THE INVENTION

An embodiment of the invention will be described below with reference to the drawings.

Figure 2:
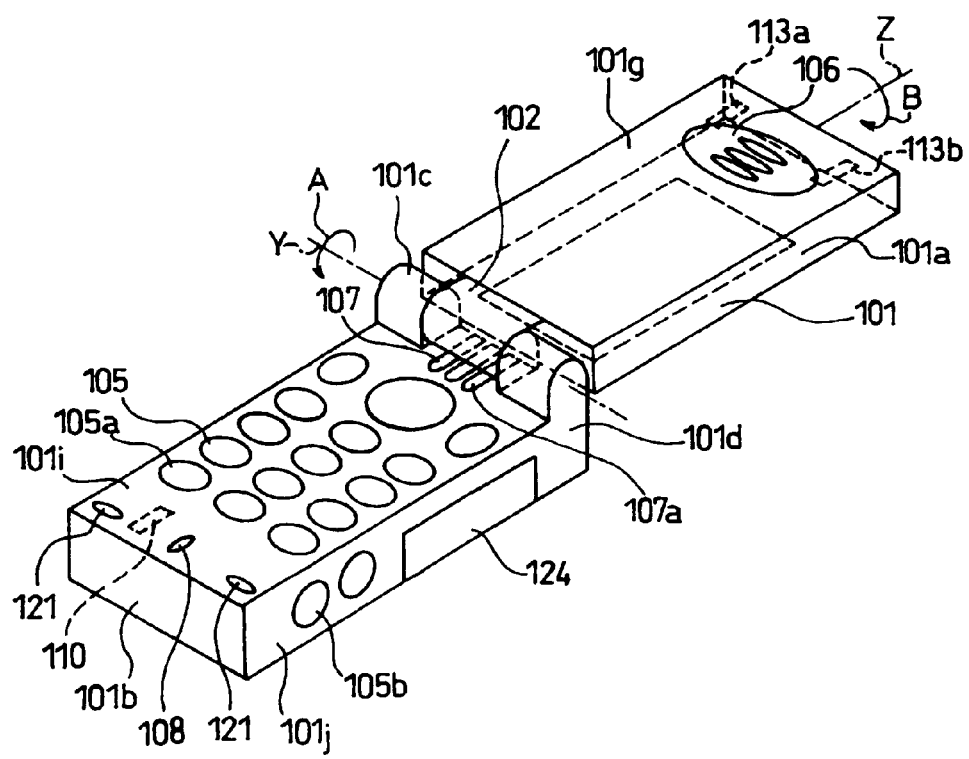
FIG. 2 is a view showing an external appearance in the first opening state of the portable terminal device according to the embodiment of the invention.
Figure 3:
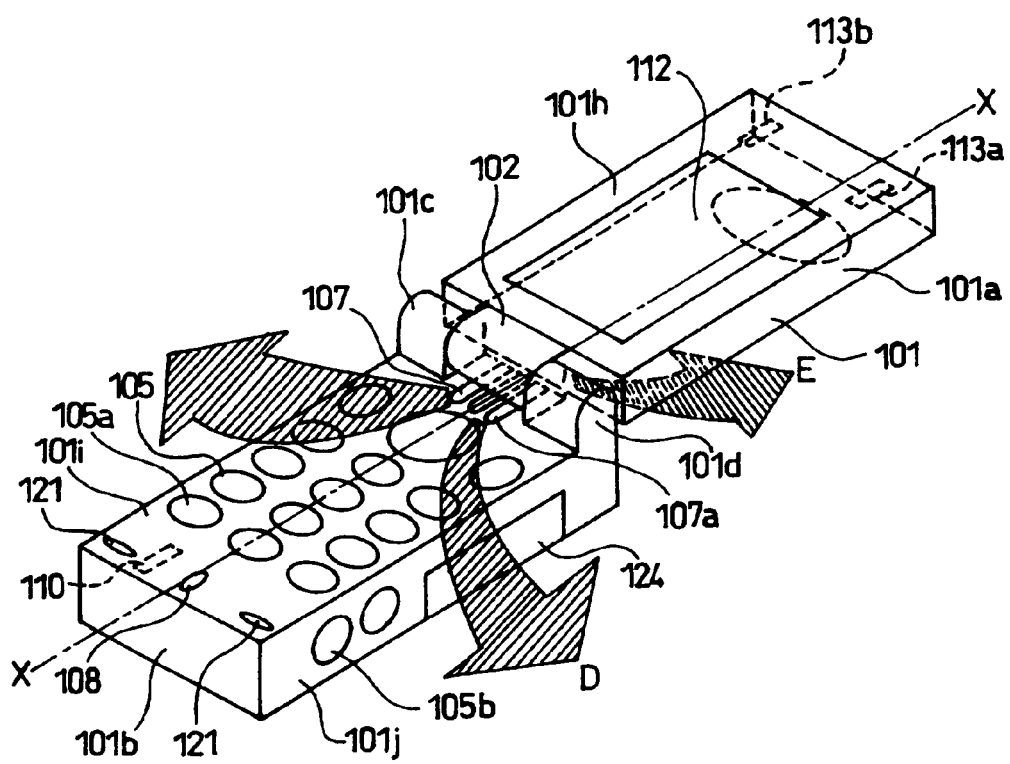
FIG. 3 is a view showing an external appearance in the second opening state of the portable terminal device according to the embodiment of the invention.
Figure 4:
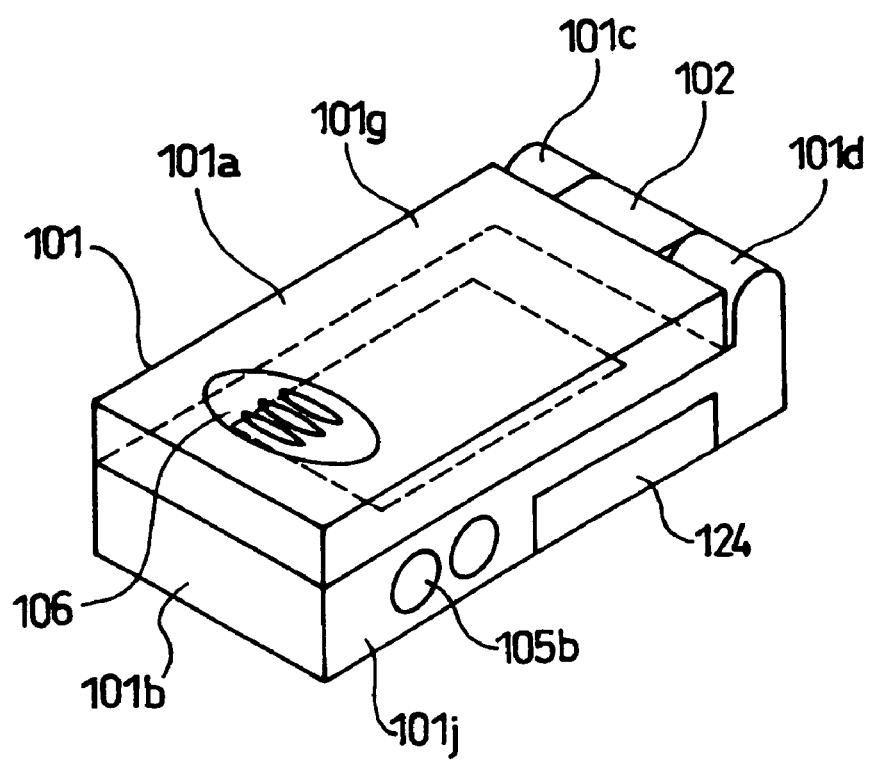
FIG. 4 is a view showing an external appearance in the second closing state of the portable terminal device according to the embodiment of the invention.
Figure 5:
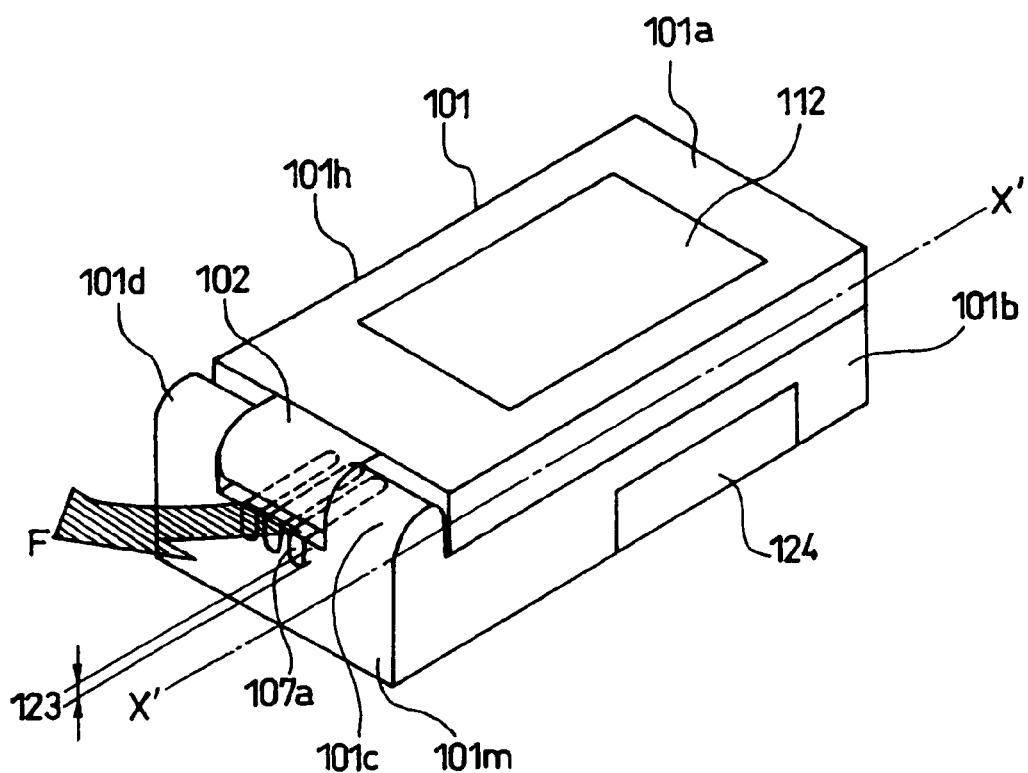
FIG. 5 is a view showing the external appearance of the portable terminal device set in the first closing state as seen in another direction.
Figure 6:
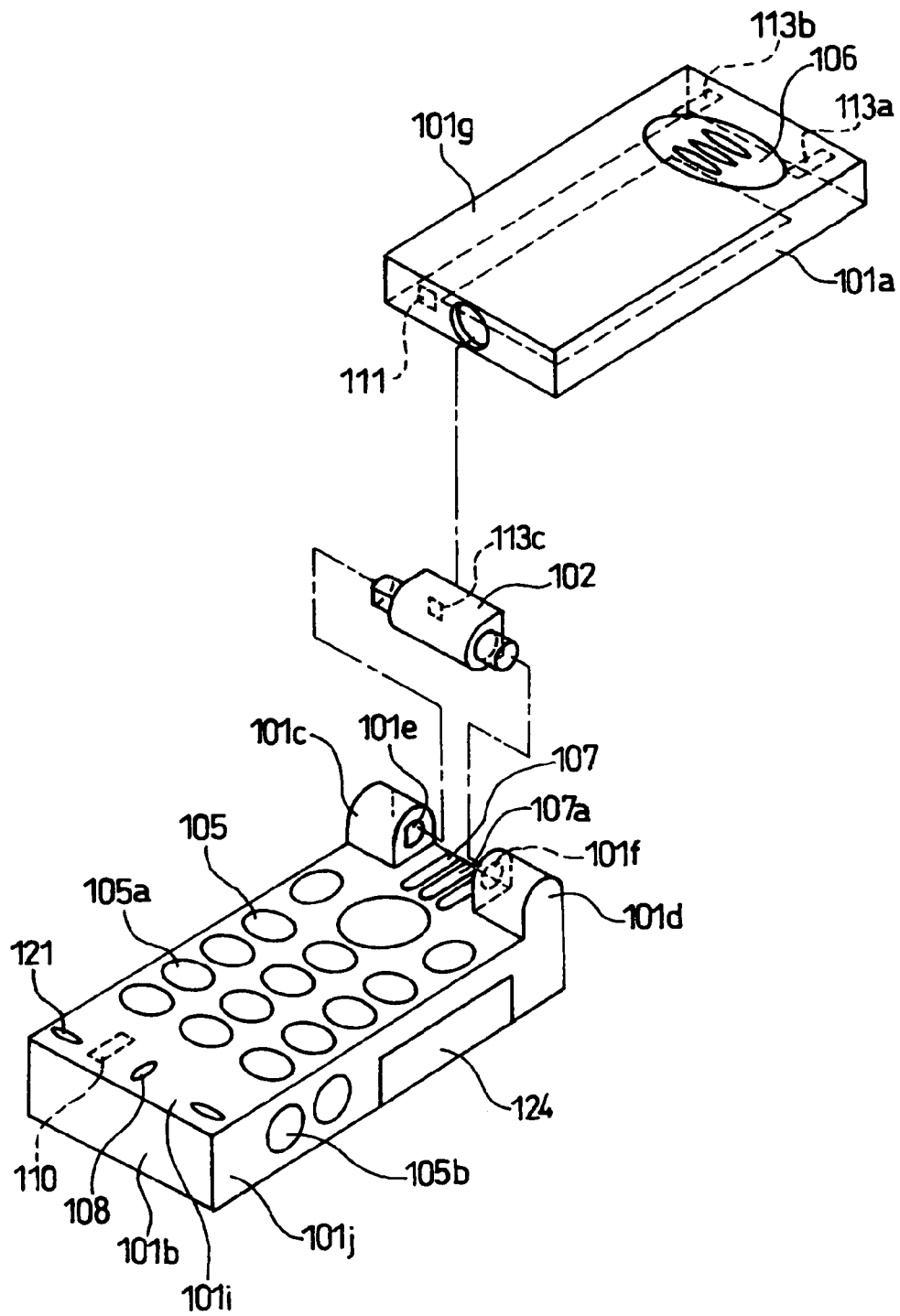
FIG. 6 is an exploded perspective view showing the portable terminal device set in the first opening state.
Figure 7:
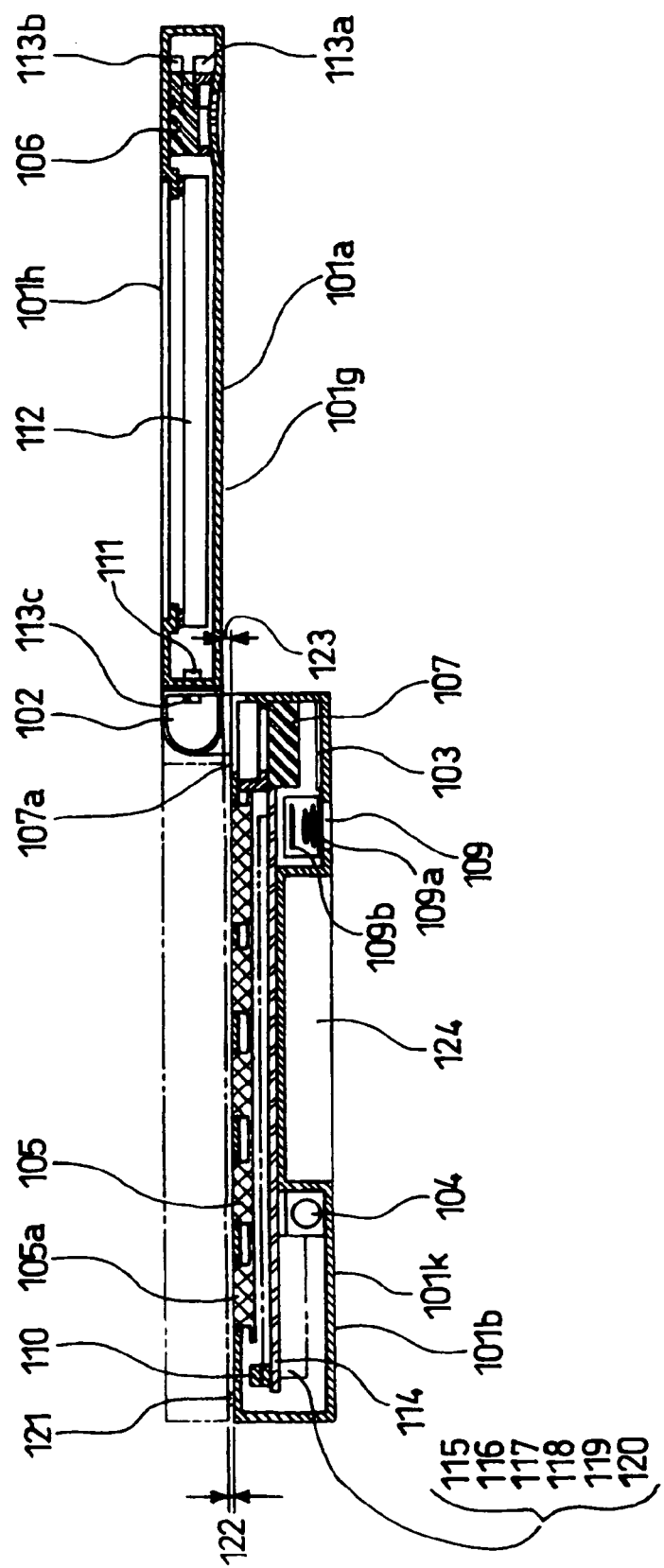
FIG. 7 is an X-X sectional view showing the portable terminal device set in the second opening state.
Figure 8:
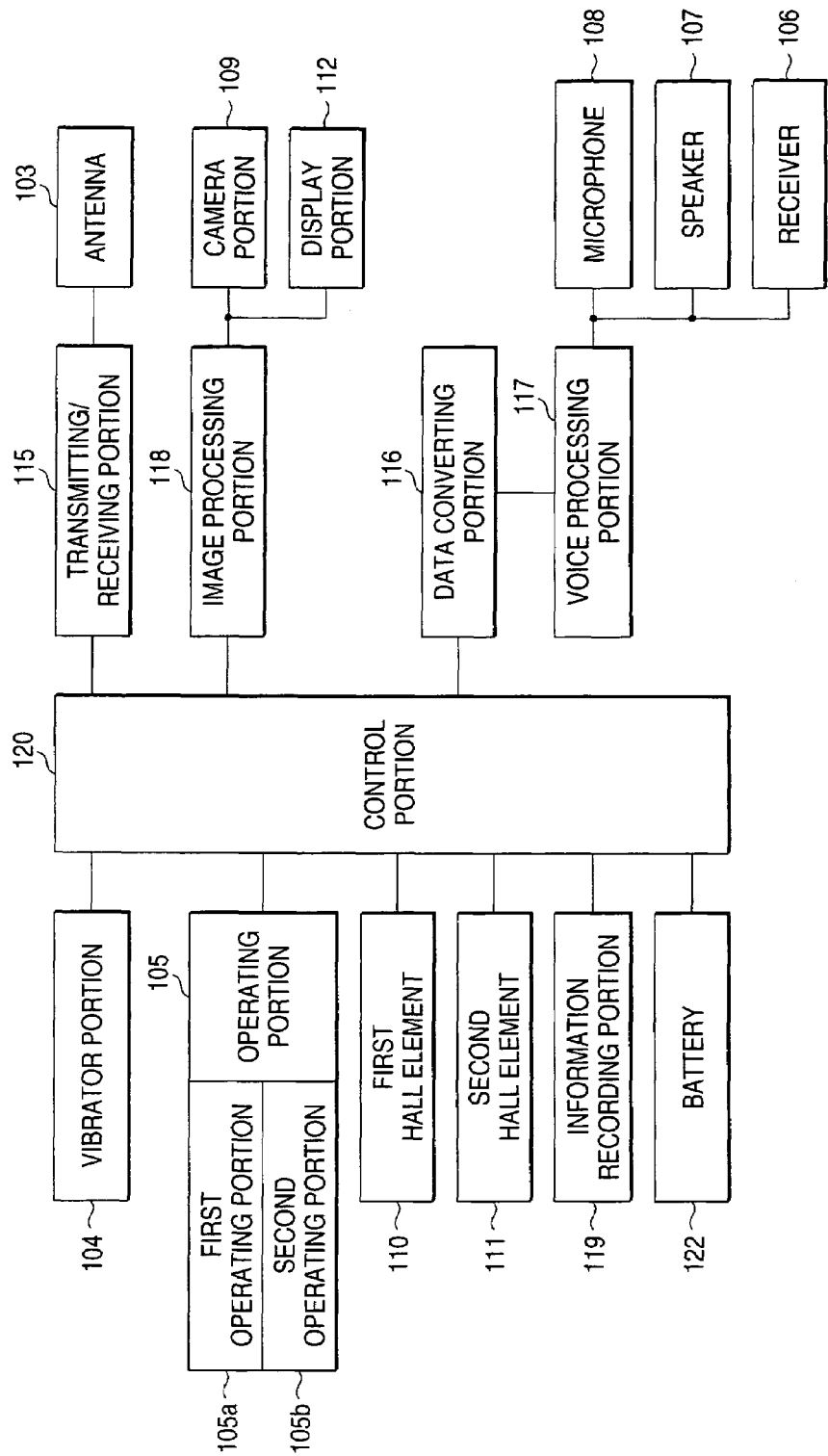
FIG. 8 is a block diagram showing the electrical structure of the portable terminal device according to the embodiment of the invention.
Figure 9:
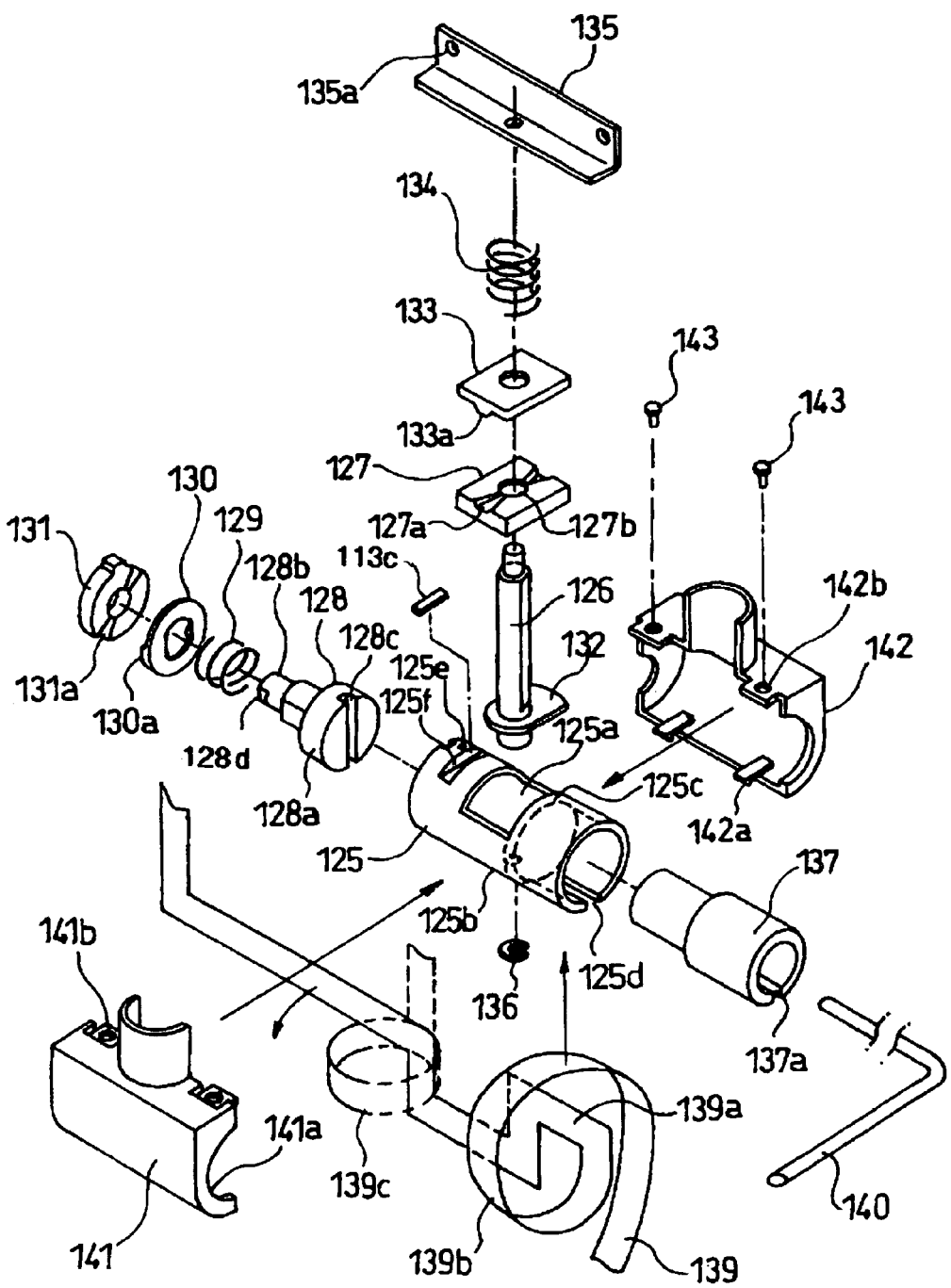
FIG. 9 is an exploded perspective view showing the hinge portion of the portable terminal device according to the embodiment of the invention.
Figure 10:
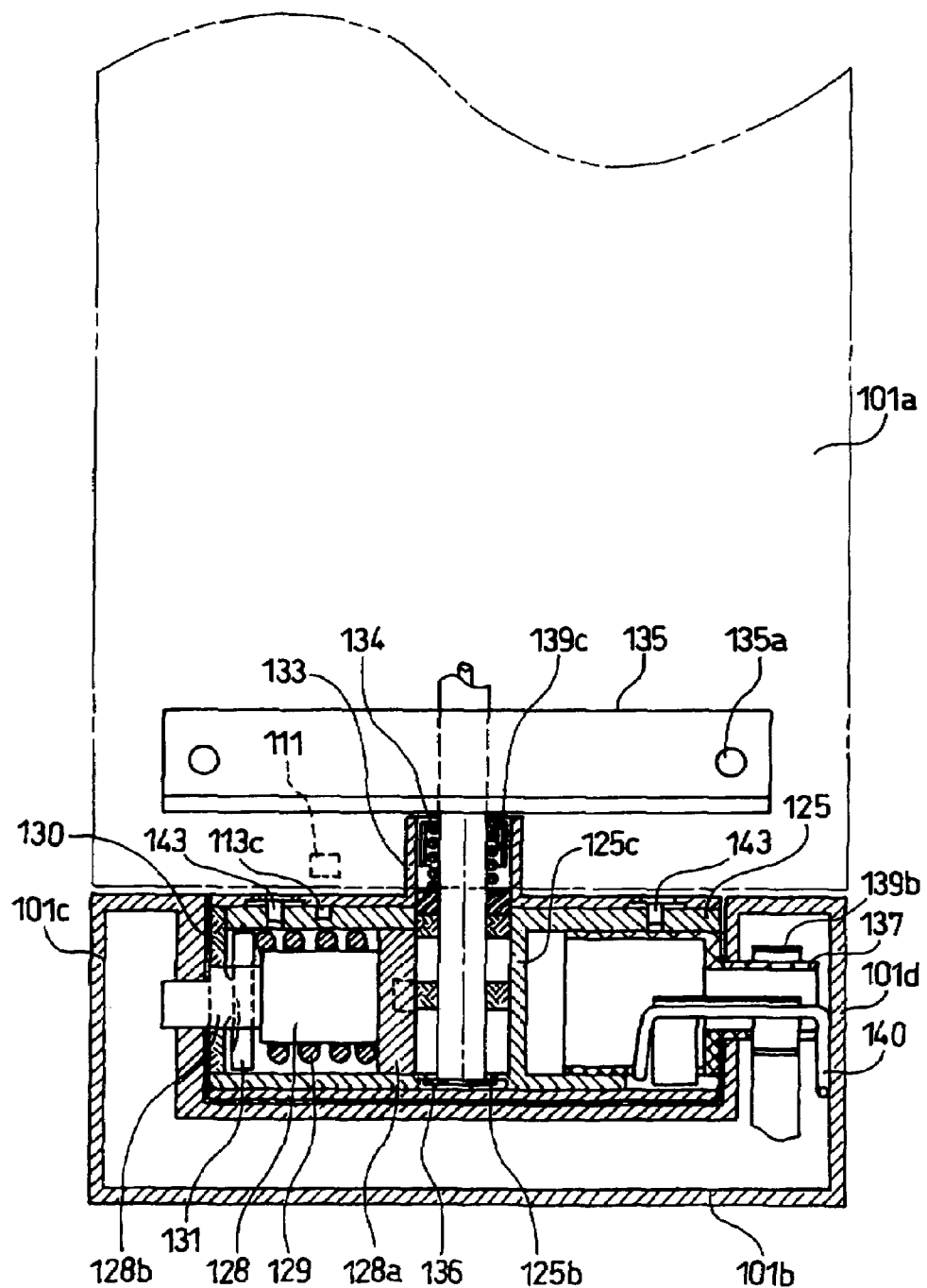
FIG. 10 is an X'-X' sectional view showing the portable terminal device illustrated in FIG. 5.
Figure 11:
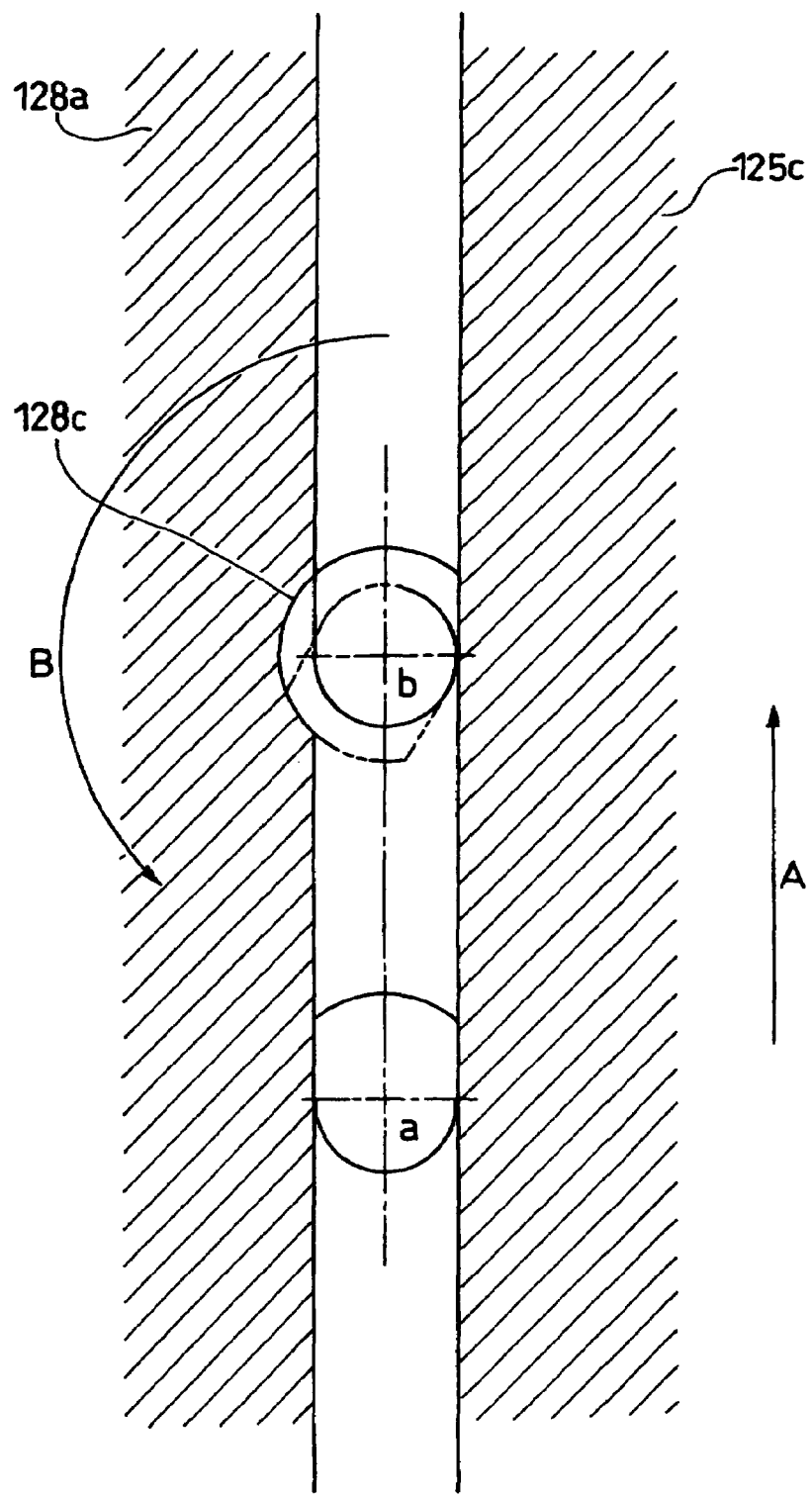
FIG. 11 is a cam diagram showing the operation of a cam attached to the hinge portion of the portable terminal device according to the embodiment of the invention.

FIG. 1 is a view showing an external appearance in the first closing state of a portable terminal device according to an embodiment of the invention. FIG. 2 is a view showing an external appearance in the first opening state of the portable terminal device. FIG. 3 is a view showing an external appearance in the second opening state of the portable terminal device. FIG. 4 is a view showing an external appearance in the second closing state of the portable terminal device. FIG. 5 is a view showing the external appearance of the portable terminal device set in the first closing state as seen in another direction. FIG. 6 is an exploded perspective view showing the portable terminal device set in the first opening state. FIG. 7 is an X-X sectional view showing the portable terminal device set in the second opening state. FIG. 8 is a block diagram showing the electrical structure of the portable terminal device according to the embodiment of the invention. FIG. 9 is an exploded perspective view showing the hinge portion of the portable terminal device according to the embodiment of the invention. FIG. 10 is an X'-X' sectional view showing the portable terminal device illustrated in FIG. 5. FIG. 11 is a cam diagram showing the operation of a cam attached to the hinge portion of the portable terminal device according to the embodiment of the invention.

In the embodiment, a state in which a display portion 112 is exposed to carry out closing will be referred to as a first closing state as shown in FIG. 1, a state in which a first housing member 101a is opened from the first closing state will be referred to as a first opening state (corresponding to a first positional relationship according to the claims) as shown in FIG. 2, a state in which the first housing member 101a is rotated by 180 degrees in the first opening state will be referred to as a second opening state (corresponding to a second positional relationship according to the claims) as shown in FIG. 3, and a state in which the first housing member 101a is closed from the second opening state will be referred to as a second closing state as shown in FIG. 4.

Description will be given to each of components included in a portable terminal device according to the embodiment.

First of all, a housing 101 will be described.

The housing 101 is constituted by the first housing member 101a and a second housing member 101b, and the two housing members can be opened and closed in the direction of an arrow A around an opening and closing axis Y through a hinge portion 102. Furthermore, the first housing member 101a is coupled to the hinge portion 102 rotatably in the direction of an arrow B around a rotation axis Z which is orthogonal to an opening and closing axis Y with respect to the second housing member 101b.

An antenna 103, a vibrator portion 104, an operating portion 105, a speaker 107 to be second voice output means, a transmitting portion (a microphone) 108, a camera portion 109, a first Hall element 110 and a printed board 114 are accommodated in the second housing member 101b.

The vibrator portion 104 serves to cause a vibration when a call comes in, thereby giving a notice of the incoming call through the vibration.

The operating portion 105 has a first operating portion 105a and a second operating portion 105b. The first operating portion 105a is provided on a main surface 101i of the second housing member 101b opposed to the first housing member 101a in the closing state, and the second operating portion 105b is provided on a side surface 101j which is adjacent to the main surface 101i of the second housing member 101b.

A user can operate the first operating portion 105a to carry out a receipt and an end and to control a volume output from a receiver 106 and the speaker 107, and to input characters, symbols and figures. By operating the second operating portion 105b, it is possible to manipulate the camera portion 109 or to carry out switching to a manner mode.

The speaker 107 is provided in the vicinity of the hinge portion 102. The direction of the output of a voice from the speaker 107 is shown in arrows C, D, E and F in FIGS. 1, 3 and 5. A sound guiding hole 107a is formed on the second housing member 101b in order to guide the voice output from the speaker 107 to the outside of the second housing member 101b well. The sound guiding hole 107a is formed over the main surface 101i and a surface 101m which is adjacent thereto.

The speaker 107 serves to output an incoming call sound when a call comes in, thereby informing the user the incoming call or to amplify and output the voice of a communicating partner during a hands-free call. In the embodiment, a component having a sound pressure level difference of approximately 20 dB(A) at 1 KHz is selected.

The microphone 108 is provided in the vicinity of an end on the opposite side of the hinge portion 102 at the main surface 101i of the second housing member 101b.

The camera portion 109 is provided side by side with a battery 124 over a back face (101k) of the main surface 101i in the second housing member 101b, and a subject in the rearward direction of the first operating portion 105a can be photographed.

A light incident from a subject caught by the camera portion 109 passes through a lens group 109a and is converted from a light signal into an electric signal at a photoelectric converting unit 109b such as a CCD (charge-coupled device) so that image information is generated.

The image information is processed in an image processing portion 118 and an image is then generated on the display portion 112.

Moreover, the camera portion 109 uses a plurality of lenses so that an excellent image having a small aberration can be obtained.

A reducing glass system for forming the image of the subject on the photoelectric converting unit can reduce various aberrations such as a distortion, a coma and an astigmatism by combining a plurality of concavo-convex lenses as compared with a single lens.

When an aperture diameter is greater (an F number is smaller) or a focal length f is smaller, moreover, an image formed by the lens can be brighter. On the other hand, the thickness of the whole lens system is increased so that the camera portion 109 is thickened.

In FIG. 7, the camera portion 109 is shown as an optical system formed by two lenses. In a design, conditions are determined depending on the size of a pixel of which image is formed and the extent of the removal of an aberration, and an optical system is determined by the combination of some positive and negative lenses. Herein, the camera portion is shown in a conceptual view. In particular, it is preferable to use a negative lens having a low refractive index in order to remove a curvature of field. For this purpose, the use of a plurality of lenses is indispensable.

In the case in which the camera portion 109 is to be accommodated in the first housing member 101a, the thickness and weight of the first housing member 101a to be accommodated is increased. For this reason, when the second housing member 101b is held by hand in the opening state, a sense of fatigue is given to the hand because the first housing member 101a which is not held by hand is heavy, which is unsuitable for a portability. Therefore, the camera portion 109 capable of giving high picture quality while avoiding an increase in the thickness of the first housing member 101a which is not held by hand for use is provided in the second housing member 101b.

The first Hall element 110 is provided in the second housing member 101b in such a manner that it is close to a first permanent magnet 113a in the first housing member 101a when the housing 101 is set in the first closing state, and is close to a second permanent magnet 113b in the first housing member 101a when the housing 101 is set in the second closing state. Moreover, the first Hall element 110 gives a detection signal to a control portion 120 when detecting the first permanent magnet 113b or the second permanent magnet 113a.

For example, the first permanent magnet 113a is close to the first Hall element 110 when the housing 101 is set in the first closing state and the second permanent magnet 113b is close to the first Hall element 110 in the second closing state. Therefore, the first Hall element 110 detects either of the permanent magnets and gives the detection signal to the control portion 120.

On the other hand, if the housing 101 is set in the first and second opening states, both of the permanent magnets 113a and 113b are separated from the first Hall element 110 so that the first Hall element 110 can detect neither of the permanent magnets 113a and 113b and does not generate the detection signal.

The printed board 114 has a transmitting/receiving portion 115, a data converting portion 116, a voice processing portion 117, the image processing portion 118, an information recording portion 119 and the control portion 120.

As shown in FIG. 8, the transmitting/receiving portion 115 is connected to the antenna 103 and serves to process data received by the antenna 103 and to transmit the data thus processed to the data converting portion 116.

The data converting portion 116 serves to convert the received data into voice data and to transmit the voice data to the voice processing portion 117.

The voice processing portion 117 serves to decode the voice data and to generate a voice signal, and to then transmit the voice signal to the receiver 106 and the speaker 107. The receiver 106 and the speaker 107 serve to output a voice corresponding to the voice signal transmitted from the voice processing portion 117.

Moreover, the voice processing portion 117 encodes the voice received by the microphone 108 and generates voice data, and then transmits the voice data to the data converting portion 116.

The data converting portion 116 converts the transmitted voice data into communication data and then transmits the communication data to the transmitting/receiving portion 115. The transmitting/receiving portion 115 processes the communication data thus received and transmits the same data as the radio wave of a radio signal through the antenna 103.

The camera portion 109 and the display portion 112 are connected to the image processing portion 118.

The receiver 106, the speaker 107 and the microphone 108 are connected to the voice processing portion 117, and the voice processing portion 117 is connected to the data converting portion 116.

Furthermore, the control portion 120 is connected to the vibrator portion 104, the operating portion 105, the first Hall element 110, a second Hall element 111, the transmitting/receiving portion 115, the data converting portion 116 and the information recording portion 119, and serves to control these components. Moreover, the control portion 120 is connected to the battery 124 and a power is supplied from the battery 124.

In addition, an output source for a voice in a voice communication is set to either the receiver 106 or the speaker 107 based on detection signals sent from the first Hall element 110 and the second Hall element 111 which will be described below. The duration of the voice communication implies a period from the start of a receiving operation after an incoming call to the end of the call and from the start of a transmitting operation to the end of the call.

Image information photographed by the camera portion 109 is recorded on the information recording portion 119 by the execution of a predetermined operation.

In addition, the information recording portion 119 can record telephone number information, voice information, image information other than image information about a photographed image (the received image information), and character information such as a mail which is being created or is transmitted or received.

With the structure described above, it is preferable that the user should bring the first closing state to turn the camera portion 109 toward a forward person when photographing the forward person. In this case, a photographed image is generated in the display portion 112. The user can carry out photographing while confirming the image displayed on the display portion 112. In the case in which a subject is the user himself (herself), that is, the user himself (herself) is to be photographed, moreover, it is preferable that the first opening state should be brought to turn the display portion 112 to the forward part of the camera portion 109. Thus, the user can carry out the photographing while confirming the display portion 112 on which the photographed image of the user himself (herself) is displayed.

Since the device is folded to be small in the closing state so that a projection area is minimized, it is suitable for the portability. In the first closing state, the display portion 112 is exposed. For this reason, when the device is taken out in a storage state in a breast pocket, for example, it is possible to immediately confirm information displayed on the display portion 112, that is, a time or the presence of an incoming call. A person who does not want other people to see the information displayed on the display portion 112 can conceal the display portion 112 by bringing the second closing state.

The information displayed on the display portion 112 in the first closing state may be set to be "non-display" and displayed after a predetermined operation. Consequently, it is possible to prevent the information from being freely seen by other people also in the first closing state.

The second housing member 101b is provided with hinge attaching portions 101c and 101d for holding the hinge portion 102 (shown in FIGS. 1 to 4). A D hole 101e for holding the hinge portion 102 is formed on the hinge attaching portion 101c and a hinge bearing portion 101f for supporting the hinge portion 102 is formed on the hinge attaching portion 101d (shown in FIG. 6).

A pair of clearance forming projections 121 to abut on the first housing member 101a in the first and second closing states are formed on the main surface 101i of the second housing member 101b, and the clearance forming projection 121 abuts on the first housing member 101a to form a first clearance 122 (shown in FIG. 7) between the first housing member 101a and the second housing member 101b in the first and second closing states.

Moreover, the hinge portion 102 is attached to the hinge attaching portions 101c and 101d to form a space together with the second housing member 101b. Consequently, a second clearance 123 (see FIGS. 5 and 7) is also formed between the second housing member 101b and the hinge portion 102.

The receiving portion (receiver) 106 to be the first voice output means, the display portion 112, the two permanent magnets (the first permanent magnet 113a and the second permanent magnet 113b), and the second Hall element 111 are accommodated in the first housing member 101a.

The two permanent magnets (the first permanent magnet 113a and the second permanent magnet 113b) are provided apart from each other in optional positions in the housing on an opposite end to an end to which the hinge portion 102 is to be coupled.

The receiver 106 is provided on a main surface 101g of the first housing member 101a in such a manner that a voice is output from the main surface 101g. The receiver 106 outputs a voice when using the portable terminal device 1 as a telephone.

The display portion 112 is provided on an opposite surface 101h to the main surface 101g of the first housing member 101a and can be constituted by a liquid crystal display, and serves to display characters, symbols, figures, images and maps.

The second Hall element 111 is provided in the first housing member 101a in such a manner that it is close to a third permanent magnet 113c in the hinge portion 102 when the housing 101 is set in the first closing state and the first opening state and it is separated from the third permanent magnet 113c in the hinge portion 102 when the housing 101 is set in the second closing state or the second opening state. Moreover, the second Hall element 111 gives a detection signal to the control portion 120 when detecting the third permanent magnet 113c.

For example, the third permanent magnet 113c is close to the second Hall element 111 when the housing 101 is set in the first closing state and the first opening state. For this reason, the second Hall element 111 detects the third permanent magnet 113c to give the detection signal to the control portion 120. On the other hand, if the housing 101 is set in the second closing state and the second opening state, the third permanent magnet 113c is separated from the second Hall element 111. Therefore, the second Hall element 111 cannot detect the third permanent magnet 113c and does not generate the detection signal.

Next, the hinge portion will be described in detail with reference to the drawings.

The third permanent magnet 113c is accommodated in the hinge portion 102. The third permanent magnet 113c is provided in a close position to the first housing member 101a (for example, a close position to the Hall element 111 in the first opening or closing state as shown in FIG. 10).

As shown in FIGS. 9 to 11, the hinge portion 102 of the portable terminal device 1 is constituted by an opening and closing shaft member 125, a rotating shaft member 126 which is orthogonal to the opening and closing shaft member 125, a support plate 127, a guide shaft 128, a first coiled spring 129, a first click convex plate 130, a first click concave plate 131, a cam 132, a second click convex plate 133, a second coiled spring 134, a bracket 135, a hinge unit 138 having an E ring 136 and an opening and closing shaft bearing 137, a flexible board 139, a cable 140, a front cover 141, a rear cover 142 and a fastening screw 143.

The hollow opening and closing shaft member 125 has a nick portion 125a in a central part, a support portion 125b for supporting the rotating shaft member 126, a parting portion 125c, a slit 125d, a screw hole 125e, and a holding portion 125f for holding the third permanent magnet 113c. The support plate 127 is provided in the nick portion 125a. The support plate 127 is provided with a concave portion 127a and a support hole 127b for supporting the rotating shaft member 126. The guide shaft 128, the first coiled spring 129, the first click convex plate 130 and the first click concave plate 131 are attached into the opening and closing shaft member 125 from a left side in FIG. 9.

The guide shaft 128 has a large diameter portion 128a and a small diameter portion 128b. A parallel groove 128c is formed on the large diameter portion 128a, and a D cut portion 128d is formed on the tip of the small diameter portion 128b. The first click convex plate 130 cannot be rotated with respect to the guide shaft 128 but is provided movably in only the thrust direction of the small diameter portion 128b. Moreover, the small diameter portion 128b is rotatably inserted into the first click concave plate 131, and furthermore, the first click concave plate 131 is fixed to the end side of the opening and closing shaft member 125.

The first coiled spring 129 energizes the first click convex plate 130 toward the first click concave plate 131 side. When the housing 101 is set in the closing state and the first opening state, a convex portion 130a of the first click convex plate 130 is engaged with a concave portion 131a of the first click concave plate 131. In the case in which the housing 101 is switched from the first opening state to the closing state, the convex portion 130a and the concave portion 131a are disengaged from each other. On the other hand, when the housing 101 is switched from the closing state to the first opening state, the convex portion 130a and the concave portion 131a are engaged with each other. Consequently, a sense of click is given to a user in the engagement of the convex portion 130a with the concave portion 131a or their disengagement.

The cam 132, the support plate 127, the second click convex plate 133, the second coiled spring 134 and the bracket 135 are attached to the rotating shaft member 126 from an upper side in a middle stage of FIG. 9. The rotating shaft member 126 is supported on the support plate 127 attached to the nick portion 125a of the opening and closing shaft member 125 and the support portion 125b of the opening and closing shaft member 125. The E ring 136 is provided on the tip of the rotating shaft member 126, and is held rotatably in the opening and closing shaft member 125. The second click convex plate 133 is provided movably in only the thrust direction of the rotating shaft member 126. Moreover, the second coiled spring 134 energizes the second click convex plate 133 toward the support plate 127 side.

A convex portion 133a of the second click convex plate 133 is continuously engaged with the concave portion 127a of the support plate 127 until the housing 101 is switched from the closing state to the opening state. The convex portion 133a of the second click convex plate 133 is disengaged from the concave portion 127a of the support plate 127 when a transition from the first opening state to the second opening state is carried out, and they are engaged with each other again in the second opening state. Also when a transition from the second opening state to the first opening state is carried out, the same operation is performed. More specifically, a sense of click is given to the user by the same structure as the convex portion 130a of the first click convex plate 130 and the concave portion 131a of the first click concave plate 131.

The bracket 135 is provided with a hole 135a to be fastened and fixed to the first housing member 101a with a screw (not shown).

The cam 132 is fixed to the rotating shaft member 126 and is accommodated in the opening and closing shaft member 125 so as to be interposed between the parting portion 125c of the opening and closing shaft member 125 and the large diameter portion 128a of the guide shaft 128. The cam 132 and the parallel groove 128c of the guide shaft 128 are constituted in such a manner that the first and second housing members 101a and 101b are parallel with each other in only the first and second closing states and the first and second opening states. At this time, the cam 132 to be rotated together with the rotation of the rotating shaft member 126 can be guided into the parallel groove 128c so that the first housing member 101a can be rotated in the direction of B. The motion will be described with reference to a cam diagram shown in FIG. 11.

In the cam diagram shown in FIG. 11, a slant line portion on a right side indicates the parting portion 125c. Moreover, a slant line portion on a left side indicates the large diameter portion 128a of the guide shaft 128 and a circular arc portion indicates the parallel groove 128c. Herein, the position of the cam 132 with the housing 101 set from the closing state to the first or second opening state is indicated as a position "a". Moreover, the position of the cam 132 with the housing 101 set in the first and second opening states is indicated as a position "b".

In the position "a", the left and right end faces of the cam 132 are surrounded by the parting portion 125c and the large diameter portion 128a of the guide shaft 128, respectively. For this reason, the cam 132 cannot be rotated. In the position "b", the parting portion 125c is placed on the right end face side of the cam 132. Therefore, the cam 132 cannot be rotated toward an opposite side to the direction of B. Since the parallel groove 128c is disposed on the left end face side of the cam 132, the cam 132 can be rotated by 180 degrees in the direction of B. In the state of a rotation by an angle of less than 180 degrees in the direction of B, a part of the cam 132 is placed in the parallel groove 128c and the direction of the thickness of the cam 132 is surrounded by the parallel groove 128c in this state. Even if the housing 101 tries to be changed in the direction of the arrow A (or an opposite direction), therefore, the change is suppressed.

Although the cam 132 and the parallel groove 128c are parallel with each other in the closing state, the rotating shaft member 126 cannot be rotated because the first housing member 101a faces the second housing member 101b.

In a state in which the housing 101 is set in a state other than the first and second opening states, accordingly, the first housing member 101a cannot be rotated in the direction of the arrow B (or an opposite direction) with the rotating shaft member 126 set to be an axis. In a state in which the rotating shaft member 126 is rotated, furthermore, the opening and closing shaft member 125 cannot be rotated. Therefore, the opening and closing operations of the housing 101 in the direction of the arrow A (or an opposite direction) cannot be carried out.

The hollow opening and closing shaft bearing 137 is attached into the opening and closing shaft member 125 from a right side in the middle stage of FIG. 9. A groove 137a of the opening and closing shaft bearing 137 is fixed in the same direction as the slit 125d.

The flexible board 139 and the cable 140 are assembled into the hinge unit 138. The flexible board 139 having a corner portion 139a electrically connects the first housing member 101a and the second housing member 101b. One of the end sides of the corner portion 139a is wound around the opening and closing shaft bearing 137 to form a first winding portion 139b, and the corner portion 139a is inserted into the opening and closing shaft bearing 137 through the groove 137a. The other end side of the corner portion 139a passes through the slit 125d and gets out of the opening and closing shaft member 125, and is wound around the opening and closing shaft member 125 by approximately half, and furthermore, is wound around the rotating shaft member 126 to form a second winding portion 139c and is thus connected to the first housing member 101a.

The cable 140 for electrically connecting a metal component provided in the first housing member 101a and a metal component provided in the second housing member 101b is inserted into the opening and closing shaft bearing 137 through the end of the opening and closing shaft bearing 137, and gets out of the slit 125d and is extended toward the first housing member 101a side, and is thus connected through the inside of the second winding portion 139c. The cable 140 is provided in order to strengthen the grounds of the housing members 101a and 101b and to avoid the breakage of the display portion 112 also when a static electricity is applied. When the antenna 103 is provided in the first housing member 101a, the cable 140 may be used in order to avoid a reduction in a gain between the antenna 103 and the transmitting/receiving portion 115 provided in the second housing member 101b as much as possible.

After the flexible board 139 and the cable 140 are assembled into the hinge unit 138, the front cover 141 and the rear cover 142 for armoring are fixed with the fastening screw 143. The front cover 141 and the rear cover 142 are provided with engagement clicks 141a and 142a and screw insertion holes 141b and 142b, respectively. The screw insertion holes 141b and 142b are disposed to be turned toward the bracket 135 side provided on the rotating shaft member 126. Moreover, the front cover 141 and the rear cover 142 surround and interpose the hinge unit 138 therebetween and thus engage the engagement clicks 141a and 142a with each other, and the fastening screw 143 is then fixed to the screw hole 125e of the opening and closing shaft member 125 through the screw insertion holes 141b and 142b. By this structure, the hinge portion 102 is finished.

The D cut portion 128d formed on the tip of the small diameter portion 128b is supported on the D hole 101e provided on the hinge attaching portion 101c of the second housing member 101b, and furthermore, the outer periphery of the opening and closing shaft bearing 137 is supported on the hinge bearing portion 101f of the second housing member 101b so that the hinge portion 102 is attached to the second housing member 101b. Moreover, the first housing member 101a is attached to the bracket 135.

While the rotating shaft member 126 is provided rotatably only when the first and second housing members 101a and 101b are set in the first and second opening states, it may be rotatable also when the housing 101 is set in another mode (for example, a state for a period in which the housing 101 is switched from the closing state to the opening state). In the embodiment, the opening and closing shaft member 125 cannot be rotated till the end of the rotation of the rotating shaft member 126 in order to prevent a hitting mark from being generated by the abutment of the corner portion of the first housing member 101a on the main surface 101i of the second housing member 101b when the opening and closing shaft member 125 is rotated in a state in which the rotating shaft member 126 is rotated by approximately 90 degrees. The case in which the housing is constituted by a material generating no hitting mark does not always apply to the above-mentioned condition.

Next, the operation of the portable terminal device according to the embodiment will be described with reference to FIGS. 12 to 15.

Figure 12:
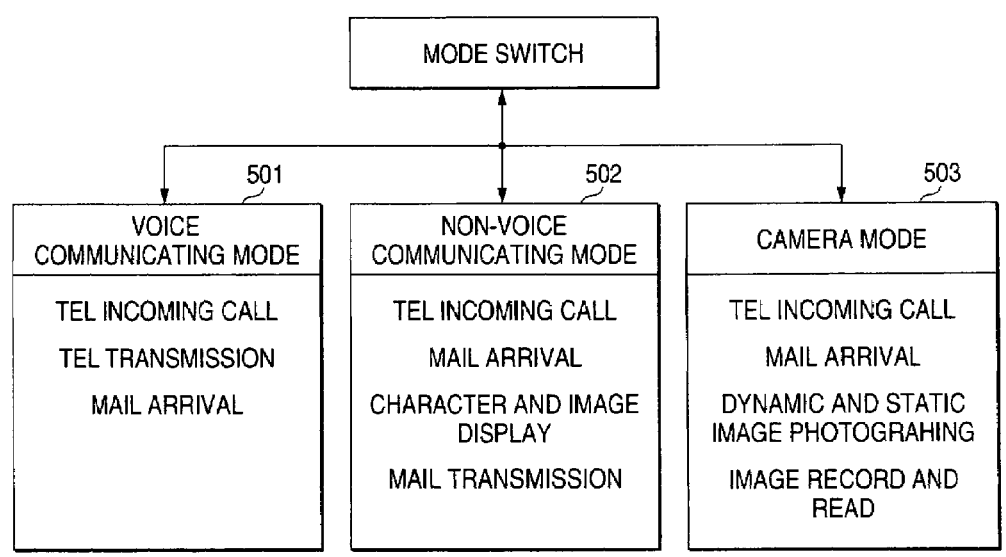
FIG. 12 is a diagram for explaining the function of each operation mode in the portable terminal device according to the embodiment of the invention.
Figure 13:
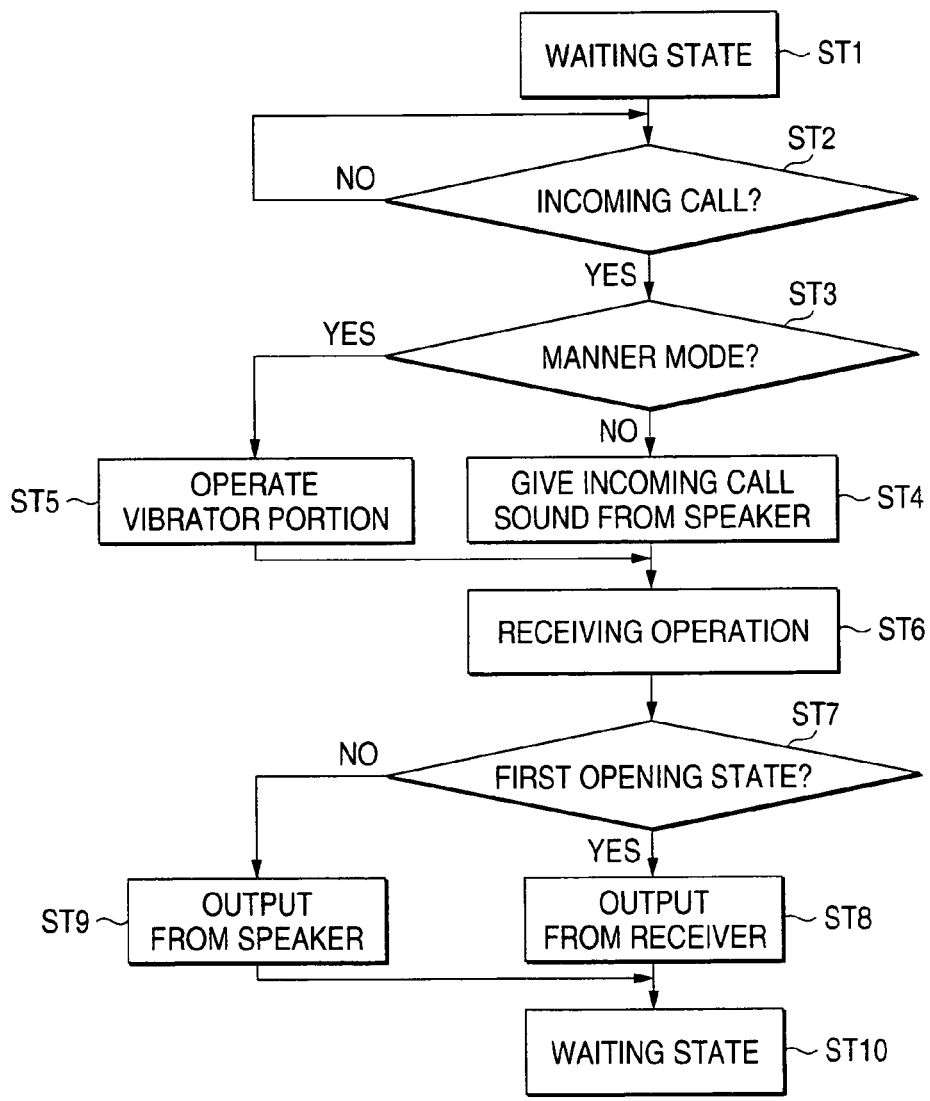
FIG. 13 is a flowchart for explaining the receiving operation of the portable terminal device according to the embodiment of the invention.
Figure 14:
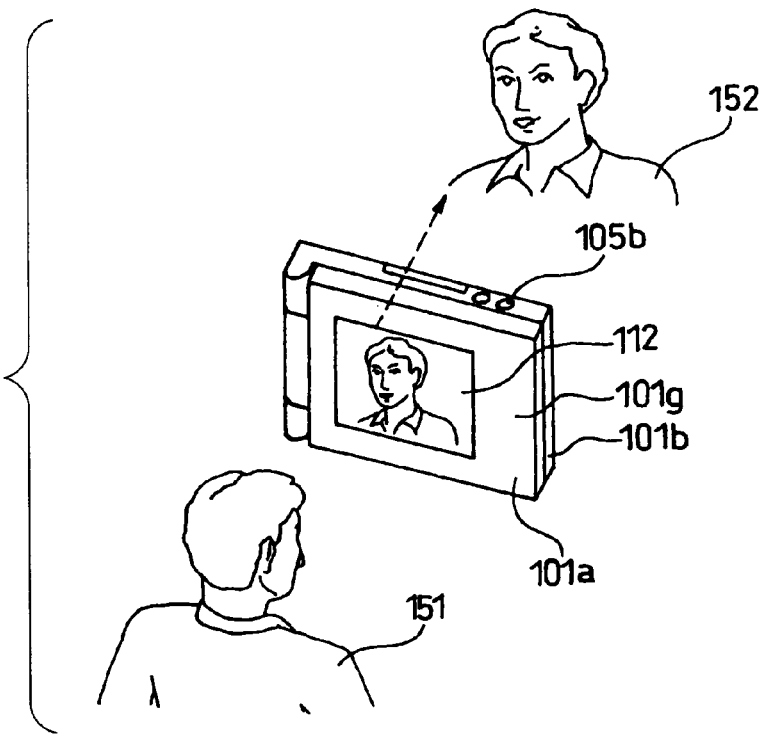
FIG. 14 is a view showing a state in which the forward subject of a user is photographed by means of the camera portion of the portable terminal device according to the embodiment of the invention.
Figure 15:
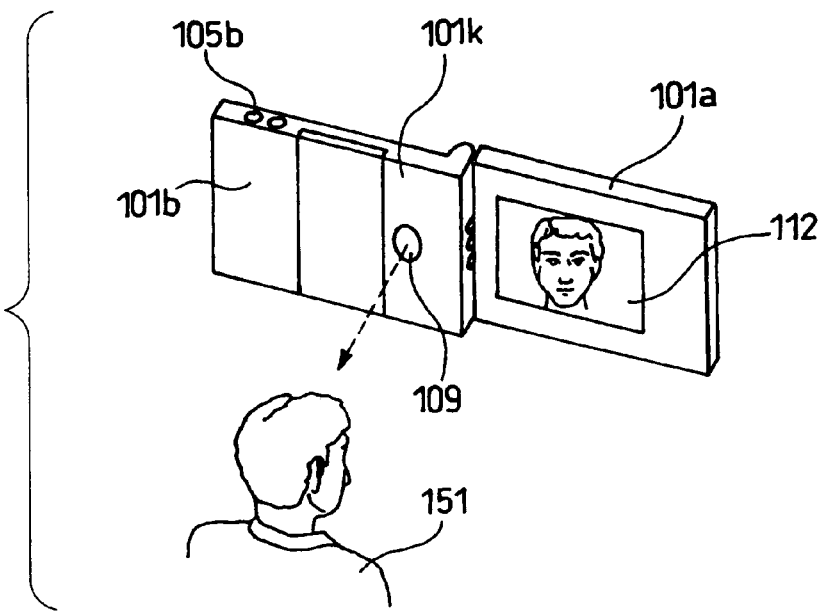
FIG. 15 is a view showing a state in which the user himself (herself) is photographed as a subject by means of the camera portion of the portable terminal device according to the embodiment of the invention.
Figure 17:
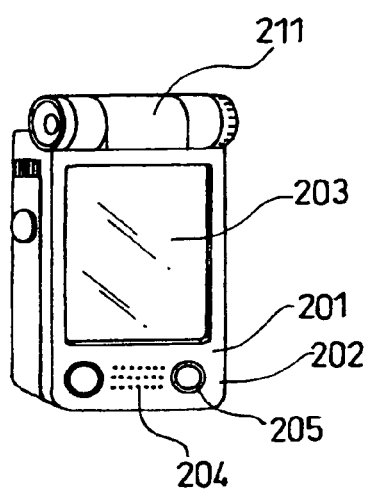
FIG. 17 is a view showing the external shape of a conventional portable terminal, (a) being a view showing a first closing state, (b) being a view showing a first opening state, (c) being a view showing a second closing state, and (d) being a view showing a second opening state.
Figure 17:
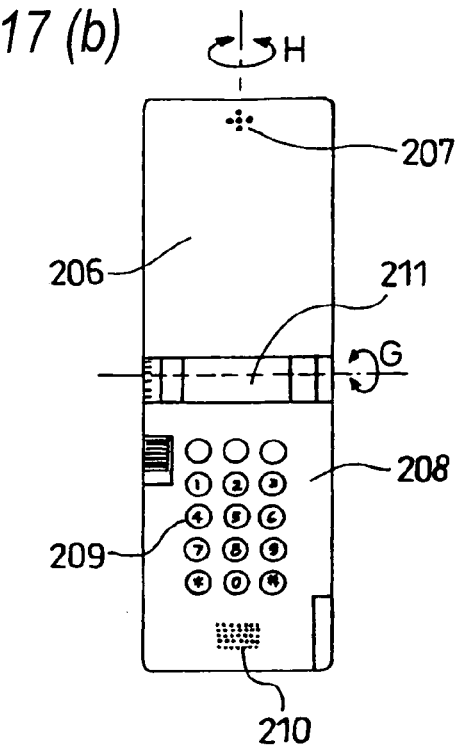
Figure 17:
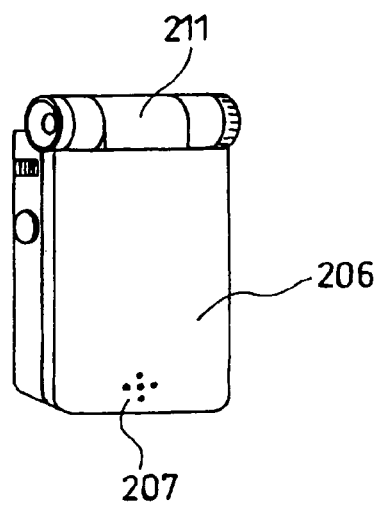
Figure 17:
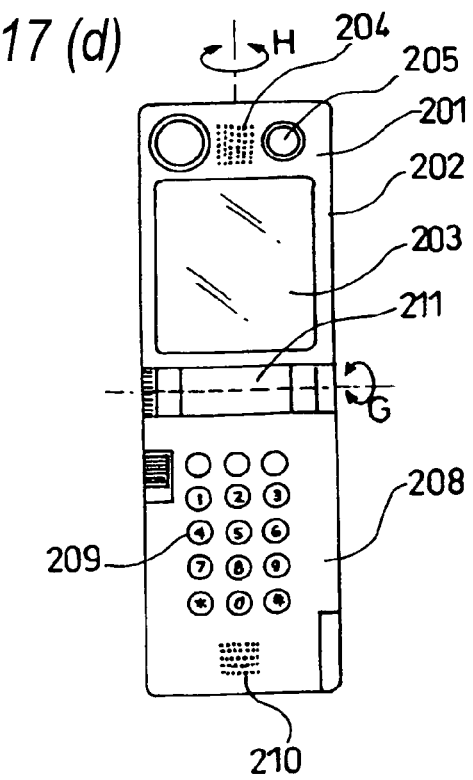

FIG. 12 is a diagram for explaining the function of each operation mode in the portable terminal device according to the embodiment of the invention. FIG. 13 is a flowchart for explaining the receiving operation of the portable terminal device according to the embodiment of the invention. FIG. 14 is a view showing a state in which the forward subject of a user is photographed by means of the camera portion of the portable terminal device according to the embodiment of the invention. FIG. 15 is a view showing a state in which the user himself (herself) is photographed as a subject by means of the camera portion of the portable terminal device according to the embodiment of the invention.

As shown in FIG. 12, in a state in which the portable terminal device 1 is turned on, a voice transmitting mode 501, a non-voice communicating mode 502 and a camera mode 503 can be set by operating the operating portion 105.

In the voice communicating mode 501, a receipt waiting operation such as a voice communication is started to carry out an incoming call operation or a transmitting operation so that a user can give a call to a communicating partner.

The receiving operation will be described with reference to FIG. 13.

In a waiting state (ST1), if it is decided by the control portion 120 that the housing 101 is set in the first closing state or the second opening state, a mark representing a time, the residual capacity of a battery or an electric field strength is displayed on the display portion 112.

When a call comes in (ST2 : Y), it is decided by the control portion 120 whether the portable terminal device 1 is set into a manner mode or not. If the manner mode is not set (ST3 : N), an incoming call sound is output from the speaker 107 (ST4). At this time, even if the portable terminal device 1 is set in the closing state, the incoming call sound is led from the second clearance 123 to an outside. On the other hand, if the manner mode is set (ST3 : Y), a notice of the incoming call is given by the vibrator portion 105 (ST5).

When a user recognizing the incoming call opens the portable terminal device 1 to carry out a receiving operation (ST6), the control portion 120 decides the opening state of the portable terminal device 1 in response to a detection signal sent from the second Hall element 111 (ST7). If the portable terminal device 1 is set in the first opening state as a result of the decision (ST7 : Y), the control portion 120 controls to output the voice of the communicating partner from the receiver 106 (ST8). On the other hand, if the portable terminal device 1 is set in the second opening state (ST7 : N), the control portion 120 controls to output the voice of the communicating partner from the speaker 107 (ST9). When a call ending operation is then carried out, the call is ended and the waiting state is returned (ST10). In the case in which the portable terminal device 1 is switched from the first opening state to the second opening state or from the second opening state to the first opening state during the call, the control portion 120 switches an output source for a receiving voice into another sound output source from which the voice is not output.

If transmitting information about a partner is previously registered on a telephone book together with a name as incoming call information at the ST2, telephone book information about the name of the partner and the face image of the partner is displayed.

In the non-voice communicating mode 502, an incoming non-voice communication (character information such as a mail) can be displayed with the receipt waiting state maintained or the display portion 112 can be caused to display the character information input from the first operating portion 105a, and the character information or voice and non-voice (image) information stored in the information recording portion 121 can be transmitted to the partner by using a transmitting function.

When the non-voice information such as a mail arrives, a message for giving a notice of the arrival is displayed on the display portion 112 with the housing 101 set in the first closing state and the second opening state. When the housing 101 is set in the second closing state and the first opening state, the message is not displayed on the display portion 112. When the housing 101 is switched into the first closing state or the second opening state, the message for giving the notice of the arrival is displayed on the display portion 112.

In the second opening state, the non-voice information such as the incoming character information or image information can be displayed on the display portion 112 by a predetermined operation (for example, a mail is opened). The non-voice information may be displayed on the display portion 112 also in the first closing state. In this case, a third operating portion capable of carrying out the operation in the first closing state may be provided in an adjacent position to the display portion 112 or the function may be given to the second operating portion 105b.

When the voice or non-voice communication is to be carried out, it is possible to utilize a telephone book function in order to decide a transmitting partner. More specifically, the housing 101 is brought into the second opening state and the first operating portion 105a is operated to cause the display portion 112 to display the name of the partner by using the telephone book function. Thus, it is possible to decide the partner by a selection.

Next, description will be given to the operation of the camera portion. In the camera mode 503, photographing can be carried out by the camera portion 109 in the first closing state and the first opening state.

The photographed image can be recorded as a static image or a dynamic image in the information recording portion 119. Referring to the dynamic image or static image recorded in the information recording portion 119, the photographed image can be reproduced and displayed on the display portion 112 and can be thus seen by bringing the second opening state and carrying out a predetermined operation. For the image photographed in the first opening state, the reverse mirror image of an image displayed on the display portion 112 is displayed. More specifically, when the photographing is carried out in the first opening state, the reverse mirror image is displayed when a recorded image is read even if a mirror image is displayed on the display portion 112. For the image photographed in the first closing state, the same image as the image displayed on the display portion 112 is displayed. A voice recorded together with the photographed image is output from the speaker 107 simultaneously with the reproduction of the photographed image.

These photographed images can be stored in a telephone book in relation to telephone number information. In the case in which a call arrives from a telephone number related to image information, the image information is displayed on the display portion 112. Moreover, the image photographed by the camera portion 109 can also be transmitted to a communicating partner.

A first photographing state will be described with reference to FIG. 14. In the first closing state, the display portion 112 is turned toward a user 151 himself (herself) and the camera portion 109 is turned toward a subject 152 in the forward part of the user 151, thereby carrying out the photographing. The user can confirm a photographing state by seeing the display portion 112 on which a reverse mirror image is displayed. By operating the second operating portion 105b, it is possible to start and end the photographing operation for a dynamic image or a static image.

A second photographing state will be described with reference to FIG. 15. When the camera portion 109 is turned toward the user 151 himself (herself) to carry out the photographing in the first opening state, the user 151 himself (herself) can confirm a photographed image which is displayed on the display portion 112. A mirror image is displayed on the display portion 112. When the mirror image is displayed on the display portion 112 for displaying the state of the photographed subject himself (herself), the subject himself (herself) is brought into the same state as the state in which he (she) sees himself (herself) in a mirror. When the subject becomes aware that a neck is inclined, for example, the direction of the inclination can easily be known. By operating the second operating portion 105b, it is possible to start and end the photographing operation of a dynamic image or a static image. Since the second operating portion 105b is used during the photographing, it is provided in a position exposed to the outer surface of the housing 101 in a state in which the manner of the device can be photographed.

More specifically, a partner can suitably be photographed in the first closing state and a subject himself (herself) can suitably be photographed in the first opening state.

While the photographing operation of the camera portion 109 can be carried out in only the first opening state, the photographing operation may be carried out also in the second opening state in which the first housing is reversed. More specifically, there is set a manner in which the display portion 112 is turned toward a photographer (user) and the camera portion 109 is turned toward a subject. Therefore, a partner can be photographed. In this case, it is possible to switch an operation for photographing the partner and an operation for photographing the user himself (herself) by simply holding the device in the same direction and rotating the first housing member 101a. Therefore, a hand to manipulate the second operating portion 105b is always identical so that an excellent operability can be obtained. In the photographing in the second opening state, it is preferable that a reverse mirror image should be displayed on the display portion 112.

Only when the photographing is carried out in the first opening state (that is, the display portion 112 and the camera portion 109 are turned in the same direction), a photographed image to be displayed on the display portion 112 is set to be a mirror image. In the case in which the photographing, reproduction and display is to be carried out in a manner other than the manner described above, a reverse mirror image is simply displayed. Consequently, a control method can be simplified (the burden of an image display processing can be relieved).

FIG. 16 collectively shows a relationship between the manner of the housing 101 and the operations of the receiver 106, the speaker 107 and the camera portion 109 according to the embodiment described above.

As described above, according to the embodiment, the positional relationship of the first housing member 101a with the second housing member 101b in the portable terminal device 1 can be decided and the output source for a voice in a voice communication can be switched based on the positional relationship thus decided. A user can carry out switching to a hands-free call or a normal call by simply changing over the portable terminal device 1 into the first opening state or the second opening state. Therefore, the device is easy to use.

According to the embodiment, moreover, the voice output from the speaker 107 is led from the second clearance 123. Also in a state in which the portable terminal device 1 is closed, therefore, an incoming call sound can be heard clearly.

According to the embodiment, furthermore, one camera portion 109 is buried in the housing (the second housing member 101b) to be held by hand. Consequently, a reduction in the thickness and weight of the housing (the first housing member 101a) which is not held by hand can be achieved and a thick lens (optical system) can also be used without strain. More specifically, when the housing is held by hand, fingers are brought down if the housing which is not held by hand is heavy. As a result, the hand is apt to be fatigued. For this reason, a sense of a light weight can be given also in use by the reduction in the thickness and weight of the other housing (the first housing member 101a) which is not held by hand. In addition, in the case in which both a user himself (herself) and a partner are to be photographed by means of one camera portion, a photographed image can be displayed on the display portion and can be confirmed during the photographing. Therefore, it is possible to carry out photographing of high picture quality and to diversify a photographic scene.

If the vertical directions of the camera portion 109 and the display portion 112 are not coincident with each other, an address control in the read of image data from an image memory in order to display an image becomes complicated when the image is to be displayed. Consequently, there is a possibility that a cost might be increased or the size of an LSI might be increased. However, the vertical direction of the display portion 112 is always coincident with that of the camera portion 109. For this reason, basically, it is preferable that the photographed image should be exactly displayed and left and right parts should be reversed to display a mirror image if necessary. Accordingly, an image processing can be simplified.

In the embodiment, when the second Hall element 111 detects the third permanent magnet 113c, it is decided that the portable terminal device 1 is brought into the first opening state to set the output source for a voice to the receiver 106. The third permanent magnet is selected in such a manner that the detection range of the third permanent magnet 113c through the second Hall element 111 is wider than the non-detection range of the third permanent magnet 113c.

In other words, when the rotating angle of the first housing member 101a in the first opening state exceeds 90 degrees, the second Hall element 111 does not detect the third permanent magnet 113c. Consequently, the output source for a voice is not switched to the speaker 107 until the rotating angle of the first housing member 101a in the first opening state exceeds 90 degrees. Therefore, it is possible to prevent an accident in which a voice having a great volume is suddenly output from the speaker 107 to influence the eardrum of a user with the user holding the receiver 106 to the ear. Thus, a safety can be ensured.

In the same manner as in the second opening state, moreover, the second Hall element 111 does not detect the third permanent magnet 113c until the rotating angle of the first housing member 101a exceeds 90 degrees. Therefore, the output source for a voice is not switched from the speaker 107 to the receiver 106. Even if the first housing member 101a is slightly rotated during a hands-free call, the hands-free call can be continuously carried out.

While the invention has been described in detail with reference to the specific embodiment, it is apparent to the skilled in the art that various changes and modifications can be made without departing from the spirit and scope of the invention.

The application is based on Japanese Patent Application No. 2003-033813 filed on Feb. 12, 2003 and contents thereof are incorporated by reference.

INDUSTRIAL APPLICABILITY

According to the invention, it is possible to provide a portable terminal device having an excellent operability in a voice communication.

The invention claimed is:

1. A portable terminal device capable of carrying out a voice communication which couples a first housing to a second housing to be opened and closed through a hinge portion, and constitutes the first housing to be rotatable around a rotating shaft member which is orthogonal to an opening and closing shaft member of the hinge portion with respect to the second housing, comprising:

first voice output means, provided on a surface of the first housing which is opposed to the second housing in a closing state;

second voice output means, provided on a surface of the second housing which is opposed to the first housing in the closing state and having a higher output level than the first voice output means;

position deciding means, for deciding a positional relationship of the first housing with the second housing; and setting means, for setting an output source for a voice in a voice communication to either the first voice output means or the second voice output means corresponding to a result of the decision obtained by the position deciding means.

2. The portable terminal device according to claim 1, further comprising a transmitting portion provided on the same plane as a surface on which the second voice output means is provided, the setting means setting the first voice output means to be the output source for a voice if it is decided by the position deciding means that the first housing has a first positional relationship with the second housing in which the first voice output means is switched from a closing state to an opening state so as not to be exposed, and setting the second voice output means to be the output source for a voice if it is decided by the position deciding means that the first housing has a second positional relationship with the second housing in which the first voice output means is switched from the closing state to the opening state so as to be exposed.

3. The portable terminal device according to claim 2, wherein the position deciding means decides that the first housing has the first positional relationship or the second positional relationship when a rotating angle of the first housing with respect to the second housing exceeds 90 degrees in the opening state.

4. The portable terminal device according to claim 2 or 3, wherein the hinge portion is coupled to the second housing to form a space together with the second housing in a closing state, and the second voice output means is provided in the vicinity of the hinge portion.

* * * * *